June 28, 1932.  F. WARSOW  1,865,067
GRINDING MACHINE
Filed Dec. 24, 1928
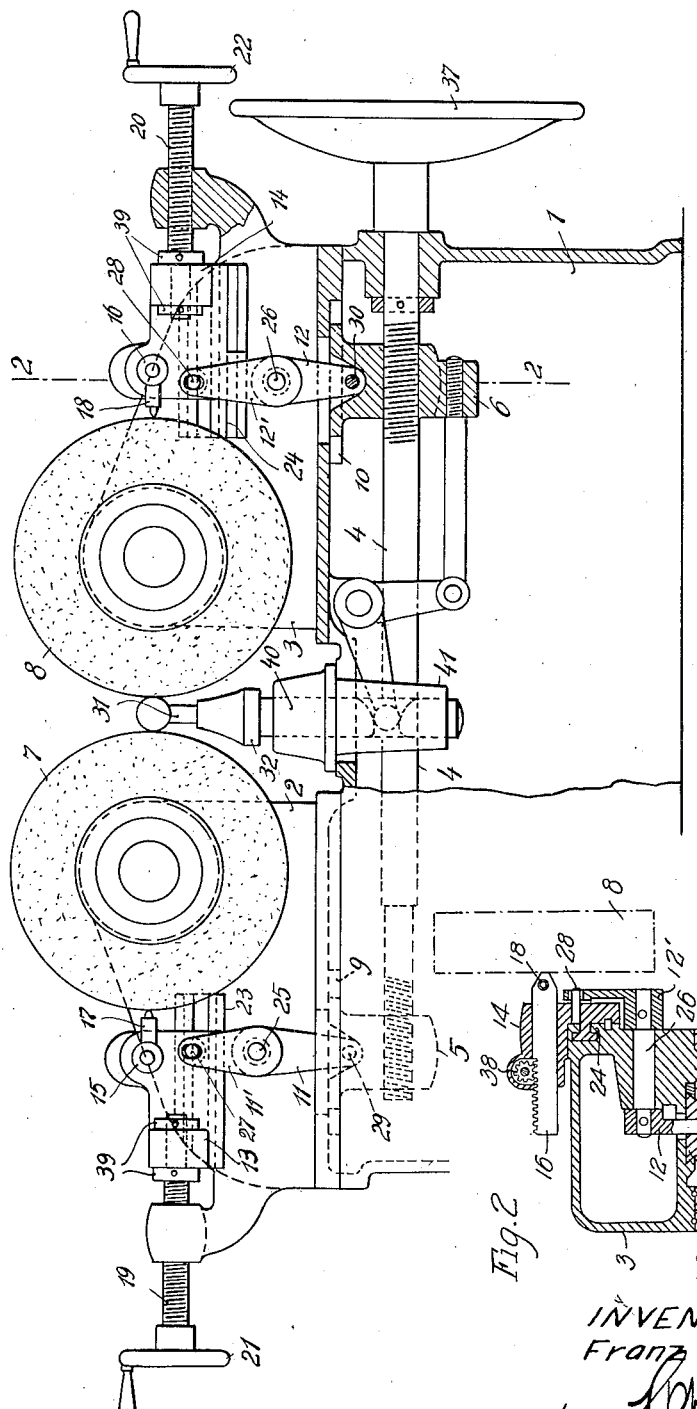
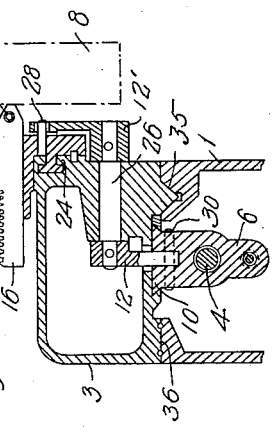
INVENTOR
Franz Warsow
by
ATTORNEY

Patented June 28, 1932

1,865,067

UNITED STATES PATENT OFFICE

FRANZ WARSOW, OF PANKOW, NEAR BERLIN, GERMANY, ASSIGNOR TO THE HEALD MACHINE COMPANY, OF WORCESTER, MASSACHUSETTS, A CORPORATION OF MASSACHUSETTS

GRINDING MACHINE

Application filed December 24, 1928, Serial No. 328,287, and in Germany January 12, 1928.

My invention relates to improvements in grinding machines, and more particularly to the apparatus for trimming or truing the grinding wheel. The object of the improvements is to provide an apparatus for the dressing and truing grinding wheels, by means of which the grinding wheels are automatically adjusted relatively to the work holder according to the reduction of the diameter of the wheels by the dressing diamond. With this object in view my invention consists in adjustably connecting the slide carrying the grinding wheel with the feed screw, and providing an operative connection between the diamond carrier and its operating mechanism and the nut engaged by the feed screw, whereby the slide is automatically adjusted relatively to the feed screw and the work holder when advancing the diamond carrier relatively to the grinding wheel. Thus it is not necessasry when trimming the wheel to reset the same by means of the feed screw.

For the purpose of explaining the invention an example embodying the same has been shown in the accompanying drawing in which the same reference characters have been used in all the views to indicate corresponding parts. In said drawing, Fig. 1 is a front elevation, partly in section, showing the invention as applied, for example, to a "centerless" grinding machine, and Fig. 2 is a sectional view on the line 2—2 of Fig. 1.

In the example shown in the drawing the bed 1 of the machine is provided at opposite sides of the work holder 31, 32 with two slides 2 and 3 mounted on suitable guide ways 35 and 36 and adapted to be shifted towards and away from the work holder by means of a feed screw 4 provided at opposite ends with left and right screw threads and carrying a hand wheel 37, the said screw threads of the feed screw engaging in nuts 5 and 6 carried by the slides 2 and 3. In suitable bearings of the slides 2 and 3 are mounted, respectively, the feeding disk 7 and the grinding wheel 8 of a "centerless" grinding machine, as is known in the art.

The nuts 5 and 6 are not rigidly secured to the slides 2 and 3, but they are shiftable relatively thereto in a direction towards and away from the work holder 31, for which purpose they are mounted in guide ways 9 and 10 formed in the bottom parts of the slides 2 and 3, and they are held in position relatively to the slides by means of arms 11 and 12 formed at their ends with slots engaging pivot bolts 29 and 30 fixed to the nuts 5 and 6, the said arms being secured to shafts 25 and 26 rockingly mounted in the slides 2 and 3.

For trimming or dressing the feeding and grinding wheels 7 and 8 respectively, diamonds 17 and 18 are provided which are fixed to diamond holders 15 and 16 mounted on slides 13 and 14 disposed on guide ways 23 and 24 of the slides 2 and 3, the diamond holders 15 and 16 being mounted to permit shifting in a direction parallel to the axes of the wheels 7 and 8 and across the circumferential surfaces of said wheels, and the slides 13 and 14 being shiftable transversely of the said axes. For shifting the diamond holders 15 and 16 the said holders are formed with rack teeth engaged by pinions 38 adapted to be rotated by suitable means, and for shifting the slides 13 and 14 feed screws 19 and 20 are provided which are rotatably connected at their inner ends with the slides 13 and 14 by means of collars 39, and which carry hand wheels 21 and 22 at their outer ends.

The shafts 25 and 26 carry upwardly directed arms 11' and 12' which are provided at their top ends with slots engaging pins 27 and 28 secured to the slides 13 and 14. Thus, the levers 11, 11', 12, 12' and the shafts 25 and 26 provide the connections between the nuts 5 and 6 and the slides 2 and 3.

The slides 2 and 3 are set in the desired positions relatively to the work by rotating the feed screw 4, and when thus rotating the feed screw the nuts 5 and 6 are carried along, the levers 11, 11' and 12, 12' and shafts 25 and 26 providing rigid connections between the parts, because the shaft 25 and the pin 27, and the shaft 26 and the pin 28 are in fixed relation to the slides 2 and 3. Therefore the main slides 2 and 3 are shifted towards or away from the work until the relative distance between the wheels 7 and 8 corresponds to the desired diameter of the work.

When shifting the slides 13 and 14 by means of the screws 19 and 20 for setting the diamonds 17 and 18 into positions for trimming the wheels 7 and 8, the upper arms 11' and 12' are carried along. But the downwardly directed arms 11 and 12 which are in pivotal engagement with the pivot bolts 29 and 30 fixed to the nuts 5 and 6 are prevented from being rocked by the nuts 5 and 6 being held in position by the feed screw 4. The levers 11, 11' and 12, 12' being rockingly mounted by means of the shafts 25 and 26 on the slides 2 and 3, the said slides are carried along together with the wheels 7 and 8, and they are moved towards the work in the same direction and the same distance as the slides 13 and 14.

The displacement of each slide 13 and 14 is composed of its displacement relatively to the main slide 2 or 3 caused by the rotation of the screws 19 and 20 and the additional displacement of the slides 13 and 14 together with the slides 2 and 3, which additional displacement is equal to the displacement of the slides 13 and 14 relatively to the slides 2 and 3, and both displacements have the same directions towards the work. Therefore the ratio of the said displacements of 2:1 corresponding to the ratio of the diameter and the radius of the grinding wheel is maintained, so that the reduction of the diameters of the wheels 7 and 8 by the trimming operation is automatically compensated. Thus the distance between the wheels 7 and 8 which corresponds to the desired diameter of the work is not varied by the trimming operation, and resetting of the wheels by means of the feed screw 4 and a gaging wheel is dispensed with.

The rail 31 supporting the work is mounted on a chuck which is carried by a bolt 40 mounted in a cross member 41 carried by the bed of the machine, so that the work may be brought into the proper position relatively to the wheels 7 and 8.

The mechanism for setting the wheels 7 and 8 according to the reduction of the diameter by trimming can be used in connection with grinding machines of any construction, and more particularly it can be used in machines for grinding the work either from one or from both sides, and any known or preferred means may be used for setting the work in the proper position relatively to the wheels.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. In a grinding machine, the combination, with the bed, means for supporting the work, a slide carrying a grinding wheel and mounted on said bed for movement towards and away from said work supporting means, a nut movably secured to said slide, and a feed screw in engagement with said nut, of a carrier for a trimming tool shiftable on said slide in a direction towards and away from said work supporting means, and a member rockingly mounted on said slide at a point intermediate said nut and carrier and in operative engagement with said carrier and nut.

2. In a grinding machine, the combination, with the bed, means for supporting the work, a slide carrying a grinding wheel and mounted on said bed for movement towards and away from said work supporting means, a nut movably secured to said slide, and a feed screw in engagement with said nut, of a carrier for a trimming tool shiftable on said slide in a direction towards and away from said work supporting means, and a member rockingly mounted on said slide at a point intermediate said nut and carrier and jointed to said carrier and nut.

3. In a grinding machine, a slidable grinding wheel carriage, a cross-feed screw for moving said carriage, a dressing device movable on said carriage to engage the cutting surface of the grinding wheel, a screw rotatable independently of said cross-feed screw for moving said dressing device, and a member connecting said dressing device with said carriage and said cross-feed screw, whereby to advance said carriage and the axis of the grinding wheel an amount sufficient to compensate for the depth of wheel material removed by said dressing device.

4. In a grinding machine, a slidable grinding wheel carriage, a cross-feed means therefor, comprising a feed screw and nut, a dressing device slidably mounted on said carriage to engage the cutting surface of the grinding wheel, a screw rotatable independently of said feed screw for moving said dressing device on said carriage, and a member pivoted to said nut and connected to said carriage and said dressing device, for communicating to said carriage and to the axis of the grinding wheel an inward feeding movement substantially corresponding to the depth of wheel material removed by said dressing device.

In testimony whereof I have affixed my signature.

FRANZ WARSOW.